US009174295B2

(12) United States Patent
Swartz

(10) Patent No.: US 9,174,295 B2
(45) Date of Patent: Nov. 3, 2015

(54) SYSTEM AND METHOD FOR CONFIGURING A TIG WELDING SYSTEM USING WORKPIECE CHARACTERISTICS

(75) Inventor: John A. Swartz, Menasha, WI (US)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 1536 days.

(21) Appl. No.: 12/351,977

(22) Filed: Jan. 12, 2009

(65) Prior Publication Data

US 2009/0188902 A1    Jul. 30, 2009

Related U.S. Application Data

(60) Provisional application No. 61/024,263, filed on Jan. 29, 2008.

(51) Int. Cl.
*B23K 9/10* (2006.01)
*B23K 9/32* (2006.01)

(52) U.S. Cl.
CPC ........................................ *B23K 9/32* (2013.01)

(58) Field of Classification Search
CPC .............. B23K 9/10; B23K 9/12; B23K 9/16; B23K 9/32
USPC ................... 219/130.1, 130.21, 136
See application file for complete search history.

(56) References Cited

U.S. PATENT DOCUMENTS 4,973,821 A * 11/1990 Martin ...................... 219/130.51
5,043,554 A * 8/1991 Kohsaka et al. ......... 219/121.39
8,373,084 B2 * 2/2013 Salsich .................... 219/121.36
8,546,728 B2 * 10/2013 Sickels .................... 219/137.71
2005/0155959 A1 * 7/2005 Bender et al. .................. 219/133
2006/0108333 A1 * 5/2006 Picard et al. ............... 219/121.62
2008/0023449 A1 * 1/2008 Salsich et al. ............ 219/121.44
2008/0128395 A1 * 6/2008 Aigner et al. ............. 219/121.62

FOREIGN PATENT DOCUMENTS

| AU | 655737 B1 | 1/1995 | |
| EP | 1419844 A1 * | 5/2004 | B23K 9/32 |
| EP | 1698420 A2 * | 9/2006 | B23K 9/12 |

OTHER PUBLICATIONS

PCT/US2009/031180 International Search Report; 2 pages.

* cited by examiner

*Primary Examiner* — Dana Ross
*Assistant Examiner* — Ayub Maye
(74) *Attorney, Agent, or Firm* — Quarles & Brady, LLP

(57) ABSTRACT

A system and method for configuring a tungsten inert gas (TIG) welding system includes a user interface to receive characteristics of the workpiece to select operational parameters for the TIG welding process. The characteristics of the workpiece may include workpiece composition or workpiece thickness. Workpiece material is translated to an output welding-type power that is alternating current (AC) power or direct current (DC) power. Workpiece thickness is translated to a specific output amperage. The operator does not need to have knowledge of operational parameters of the TIG welding system and can configured the system using workpiece characteristics.

17 Claims, 2 Drawing Sheets

SYSTEM AND METHOD FOR CONFIGURING A TIG WELDING SYSTEM USING WORKPIECE CHARACTERISTICS

REFERENCE TO RELATED APPLICATIONS

This application is based on provisional application Ser. No. 61/024,263, filed Jan. 29, 2008, and entitled "Front Panel and Interface for a Welding Machine," and claims the benefit thereof.

BACKGROUND OF THE INVENTION

The present invention relates generally to welding-type systems and, more particularly, to a system and method for configuring a tungsten inert gas (TIG) welding system for operation using workpiece characteristic data.

There are a large number of welding processes available for use in industry. For example, some welding processes include gas tungsten arc, oxygen gas welding, and shielded metal arc welding. The gas tungsten arc welding process is generally referred to as tungsten inert gas (TIG) welding. A typical TIG welding apparatus includes a welding component that is commonly referred to as welding torch and is designed to control a tungsten electrode during a welding process. The electrode is heated to extremely high temperatures by electrical power received from the power supply. At appropriate voltage and current, a welding arc is created between the electrode and a workpiece to be welded.

Another well-known welding system and process is referred to as metal inert gas (MIG) welding. When performing MIG welding, a consumable wire electrode is driven toward the weld location to be deposited and aid in forming the weld. In order to do so, sufficient current must be delivered by the welding-type power supply to transfer the consumable wire to the workpiece, fuse therewith, and form the weld.

Hence, to perform a MIG or TIG process, the operator must determine the appropriate operational parameters need to drive the process, such as current, voltage parameters, and/or wire feed speed (WFS). However, in the case of a TIG process, the operator must also determine additional operational parameters, such as polarity, frequency, and the like. As a result, configuring and operating a TIG welding system and process is considerably more complex than other welding process, such as MIG welding process. Accordingly, TIG welding processes are generally reserved for individuals with a relatively high training and/or experience level.

Therefore, it would be desirable to have a system and method for configuring a TIG welding process without requiring the operator to have extensive knowledge of the technical considerations associated with traditional operational parameters, such as electrical properties.

BRIEF SUMMARY OF THE INVENTION

The present invention overcomes the aforementioned drawbacks by providing a system and method for configuring a TIG welding system to perform a TIG welding process using workpiece characteristics that are translated into operational parameters by the TIG welding system.

In accordance with one aspect of the present invention, a tungsten inert gas (TIG) welding system is disclosed that includes a power source having a base, a front panel and a rear panel extending from the base, and a pair of side panels extending from the base and between the front panel and the rear panel. A top panel extends between the front panel, rear panel, and pair of side panels and parallel to the base to form an enclosure having power conversion components arranged therein. The system also includes a power input configured to receive an input power and deliver the input power to the enclosure for power conversion and a power output configured to deliver welding-type power from the enclosure to a welding torch to perform a TIG welding process on a workpiece. A user interface is provided that is configured to receive characteristics of the workpiece to select operational parameters for the TIG welding process.

In accordance with another aspect of the present invention, a tungsten inert gas (TIG) welding system is disclosed that includes a user interface configured to receive a workpiece material or a workpiece thickness and correlate the workpiece material or the workpiece thickness to operational parameters for the TIG welding process.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and.

DETAILED DESCRIPTION OF THE INVENTION

Figure 1:
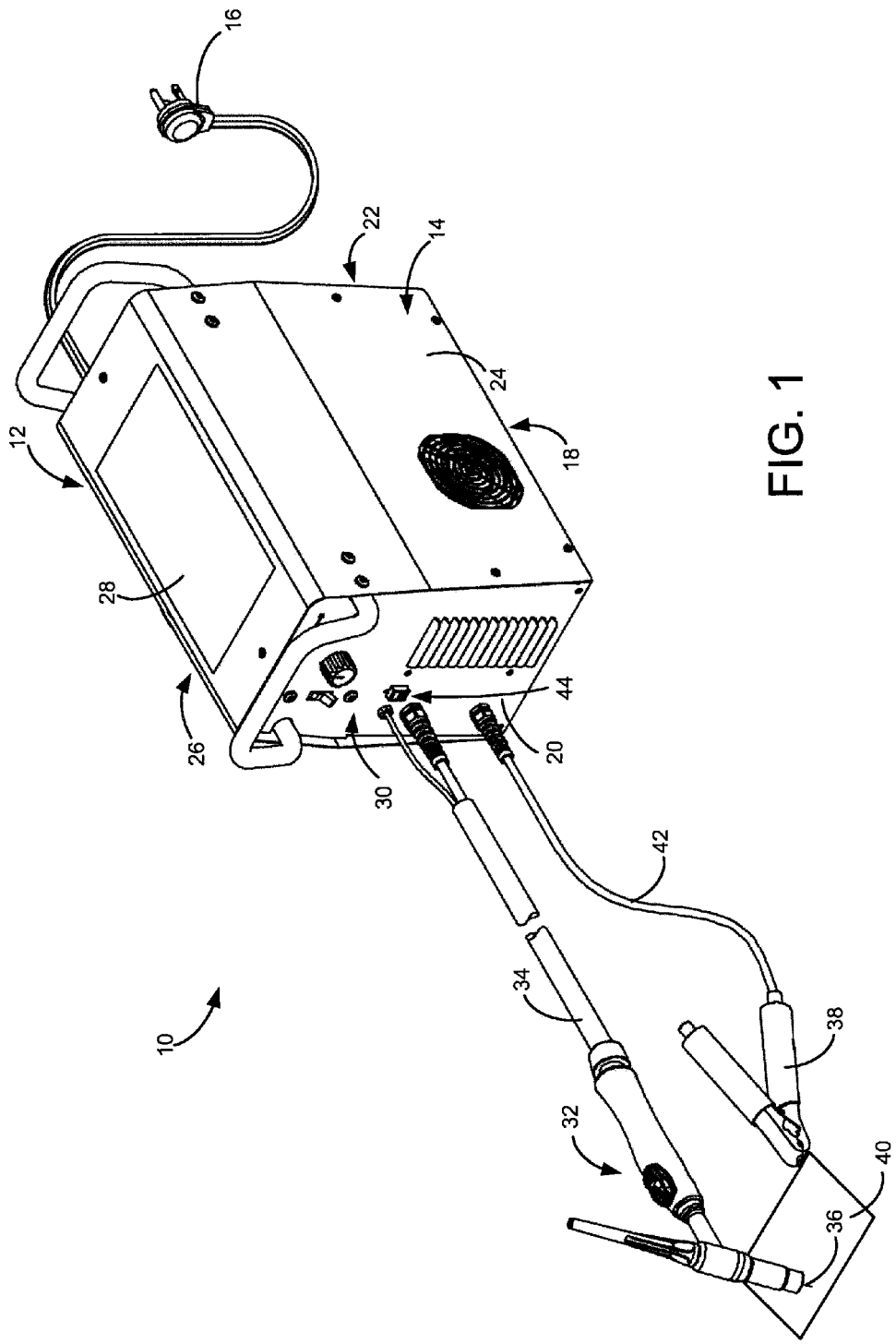
FIG. 1 is a perspective view of a TIG welding-type system incorporating the present invention.

Referring now to FIG. 1, a tungsten inert gas (TIG) welding-type system 10 includes a power supply 12 disposed within an enclosure 14. The power supply 12 is configured to condition raw power, for example from a transmission power line received via a traditional plug 16, into a power suitable for welding. The enclosure 14 has power conversion components there to convert input power from the plug 16 to welding-type power and is defined by a base 18, front and back panels 20, 22, and a pair of side panels 24, 26 attached to the base 18. A top cover 28 is secured to the pair of side panels 24, 26 to form the enclosure 14. The front panel 20 includes a user interface that, as will be described, is configured to receive workpiece characteristics to configure the power supply 12 for a desired TIG welding process. A welding torch 32 is connected to the power supply 12 via a welding cable 34. The torch 32 is designed to hold a tungsten electrode 36. To complete a welding circuit, a clamp 38 is provided to connect a workpiece 40 to the power supply 12 via a cable 42. A gas cylinder (not shown) supplies gas that is delivered to the torch 32 during the welding process. Additionally, the front panel 20 includes a foot-pedal receptacle 44 to allow connection of a foot pedal control (not shown) to the system.

Figure 2:
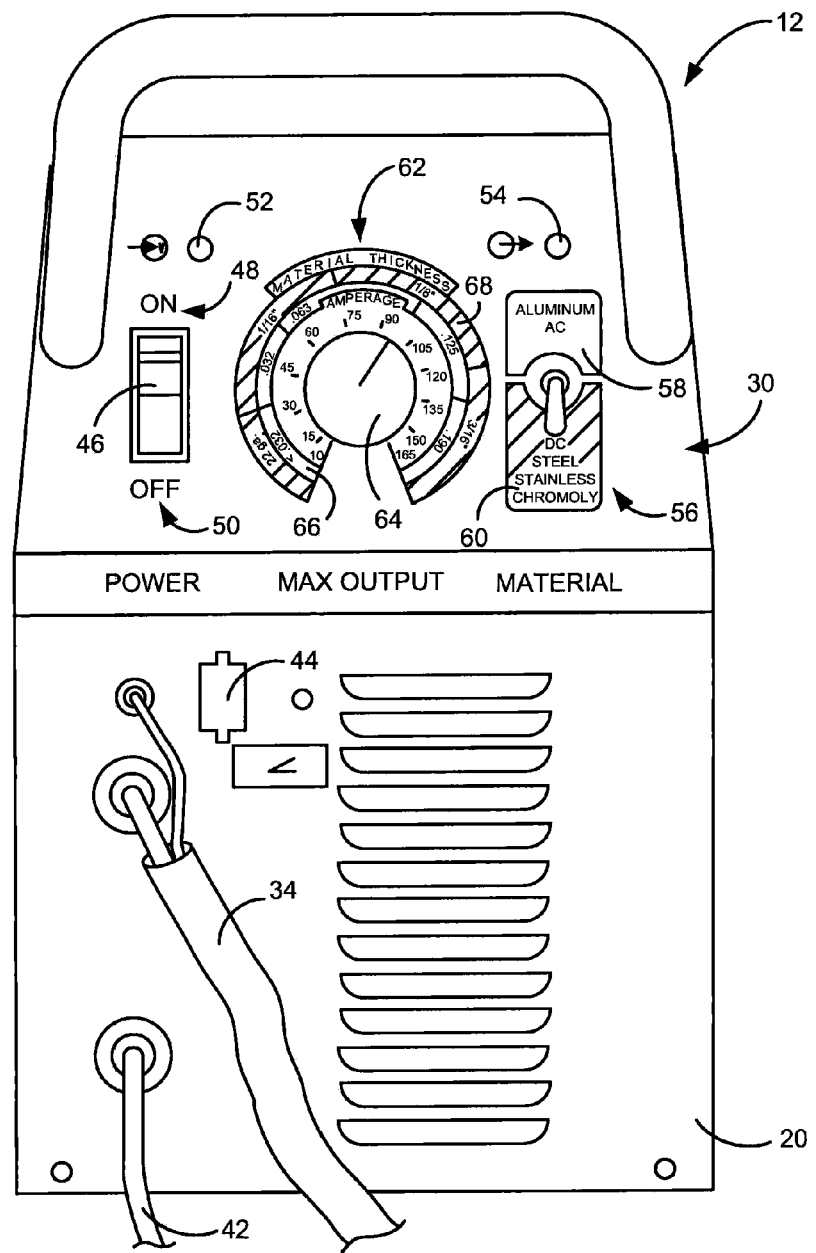
FIG. 2 is a front view of the TIG welding-type system of FIG. 1 illustrating a user interface configured to receive workpiece characteristics to configure the TIG welding-type system for operation.

Referring now to FIG. 2, the user interface 30 of the power source 12 is shown in detail. The user interface 30 includes a power switch 46 that can be toggled between an "ON" position 48 and an "OFF" position 50. A power indicator 52 is located proximate to the power switch 46 that is configured to indicate, such as by illumination, when the power switch 46 is in the ON position 48. Additionally, the power indicator 52 may indicate, such as by flashing, when input power varies significantly, such as by more than a 10 percent of expected input power. In a manner similar to the power indicator 52, an output indicator 54 is provided that indicates, such as by illumination, when output power is being delivered. Also, the output indicator 54 may be configured to indicate that output power is unavailable despite input power being available, such as during an overheat condition. In this case, the output indicator may flash to indicate the overheat condition.

In addition to the above-described input and feedback devices, the user interface 30 has a plurality of specially-configured, user-interfaces that enable the operator to set the power source 12 using workpiece characteristics instead of traditional operational parameters, such as current, voltage, frequency, and the like. First, a material-composition, selection interface 56 is provided. The material-composition, selection interface 56 may be configured as a switch that can be toggled between a first material-type position 58 and a second material-type position 60. In the illustrated configuration, the first material-type position 58 is designated for aluminum and the second material-type position is designated for steel, stainless steel, or chrome-moly.

Thus, the material-composition selection interface 56 is configured to receive information relating to the material-composition of the workpiece. However, this information is used to select the type of current to be delivered by the power source 12. Specifically, though a selection of material-composition is conducted by the operator using the material-composition selection interface 56, this information is used to select between alternating current (AC) power and direct current (DC) power. Hence, the operator does not need to know the meaning of "AC power" or "DC power" or the specific conditions when a specific power should be used. Rather, the operator only needs to know the type of material that the operator seeks to weld, which is much less difficult to understand or ascertain.

In addition, it is contemplated that the material-composition selection interface 56 may also serve as an educational tool. Specifically, as illustrated the first material-type position 58 and second material-type position 60 may not only indicate the material type to be input to the power source 12, it may also indicated the associated type of power that will be provided by the power source 12 based on the material type that is indicated by the operator. In this case, the operator is repeatedly educated as to the proper operational parameters to select based on the workpiece characteristics. Hence, over time, the operator will be taught by the use of the user interface 30 to use other TIG welding systems that do not include the specialized user interface of the present invention.

In addition to the material-composition, selection interface 56, the user interface 30 includes a material-thickness user interface 62. The material-thickness user interface 62, like the material-composition selection interface 56, allows the operator to configure the power source 12 for operation using workpiece characteristics rather than operational parameters. In this case, instead of selecting a proper amperage, as would typically be required, the operator indicates the thickness of the workpiece via the material-thickness user interface 62. In the illustrated configuration, the operator turns a dial interface 64 to a position corresponding to a particular thickness of the workpiece, as indicated by the plurality of thickness indicators 66, 68 arranged about the dial 64. In particular, a first set of thickness indicators 66 is associated with a selection of aluminum 58 by the material-composition user interface 56 and a second set of thickness indicators 68 is associated with a selection of steel, stainless steel, or chrome-moly 60 by the material-composition user interface 56. In the illustrated configuration, this correlation or association is communicated using a color coding system. That is, the first material-type position 58 and the first set of thickness indicators 66 share the same color coding and the second material-type position 60 and the second set of thickness indicators 68 share the same color coding.

Thus, the material-thickness selection interface 62 is configured to receive information relating to the material-thickness of the workpiece. However, this information is used to select the type of amperage to be delivered by the power source 12. Hence, the operator does not need to know the meaning of "amperage," the specific amperages needed for a particular workpiece thickness, or how amperage needed for a particular workpiece thickness varies between the use of AC power and DC power. Rather, the operator only needs to determine the thickness of the material that the operator seeks to weld, which is much less difficult to understand or ascertain.

In addition, it is contemplated that the material-thickness selection interface 62 may also serve as an educational tool. Specifically, as illustrated, it may also indicate the associated amperage will be provided by the power source 12 based on the material thickness that is indicated by the operator. In this case, the operator is repeatedly educated as to the proper operational parameters to select based on the workpiece characteristics. Hence, over time, the operator will be taught by the use of the user interface 30 to use other TIG welding systems that do not include the specialized user interface 30 of the present invention.

Therefore, a system and method is provided for configuring a TIG welding system to perform a TIG welding process using workpiece characteristics that are translated into operational parameters by the TIG welding system. An uneducated operator can fully configure a TIG welding system without any working knowledge of operational parameters by using the readily determinable characteristics of the workpiece.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A tungsten inert gas (TIG) welding system including a power source comprising:
    a base;
    a front panel and a rear panel extending from the base;
    a pair of side panels extending from the base and between the front panel and the rear panel;
    a top panel extending between the front panel, rear panel, and pair of side panels and parallel to the base to form an enclosure having power conversion components arranged therein;
    a power input configured to receive an input power and deliver the input power to the enclosure for power conversion;
    a power output configured to deliver welding-type power from the enclosure to a welding torch to perform a TIG welding process on a workpiece; and
    a user interface configured to receive characteristics of the workpiece to select operational parameters for the TIG welding process, the user interface including
        a first user input device selectable between a ferrous alloy position and non-ferrous alloy position,
        a second user input device separate from the first user input device including a rotary dial configured to adjust the amperage utilized in the TIG welding process, a first indicator ring of material thickness values at least partially surrounding the rotary dial and corresponding to the ferrous alloy position of the first user input device, a second indicator ring of material thickness values at least partially surrounding the rotary dial and corresponding to the non-ferrous alloy position of the first user input device, and a third indicator ring at least partially surrounding the rotary dial and having a plurality of power-related values, wherein the second user input device may be aligned with a desired material thickness value on one of the first indicator and the second indicator to select the desired material thickness value and a power-related value.

2. The system of claim 1 wherein the first user input device is configured to select between a plurality of categories of materials and translate a selected category of material to one of configures the power output to provide alternating current (AC) power when the first user input device is in the non-ferrous alloy position and direct current (DC) power when the first user input device is in the ferrous alloy position.

3. The system of claim 1 wherein the second user input device is configured to select between a plurality of thickness values and translate a selected thickness value to an output amperage.

4. The system of claim 1 wherein the user interface is configured to correlate given characteristic of the workpiece to an operational parameter and communicate the correlation to an operator to educate the operator.

5. The system of claim 1 wherein the user interface is formed on the front panel.

6. The system of claim 1, wherein the user interface is configured to correlate given characteristic of the workpiece to an operational parameter.

7. The system of claim 1, wherein the material selection first user input device interface includes a switch.

8. The system of claim 1, wherein the operational parameters of the TIG welding process are set by the relative positions of the first user input device material switch and the rotary dial second user input device.

9. The system of claim 1, wherein the amperage of the TIG welding process are set by the relative positions of the first user input device material switch and the rotary dial second user input device.

10. The system of claim 1, wherein the first indicator ring, the second indicator ring, and the third indicator ring are concentric.

11. The system of claim 1, wherein the third indicator ring displays amperage values.

12. A welding system including a power source comprising:

an enclosure having power conversion components arranged therein;

a power input configured to receive an input power and deliver the input power to the enclosure for power conversion;

a power output configured to deliver welding-type power from the enclosure to a welding torch to perform a welding process on a workpiece; and a user interface configured to receive characteristics of the workpiece to select operational parameters for the welding process, the user interface including:

a user input device including a rotary dial configured to adjust operational characteristics utilized in the welding process, a first indicator ring of material thickness values associated with the user input device and at least partially surrounding the rotary dial, and a second indicator ring of power characteristics at least partially surrounding the rotary dial, wherein user adjustment of the rotary dial to select a first one of the material thickness values of the first indicator ring and power characteristics of the second indicator ring also selects a corresponding second one of the material thickness values of the first indicator ring and power characteristics of the second indicator ring.

13. The system of claim 12, wherein the second indicator ring displays amperage values.

14. The system of claim 12, wherein the user input device is configured to select between a plurality of thickness values and translate a selected thickness value to an output amperage.

15. The system of claim 12, wherein the user interface is configured to correlate given characteristic of the workpiece to an operational parameter and communicate the correlation to an operator to educate the operator.

16. The system of claim 12, wherein the user interface is configured to correlate given characteristic of the workpiece to an operational parameter.

17. The system of claim 12, wherein the first indicator ring and the second indicator ring are concentric about the rotary dial.

* * * * *